United States Patent [19]

Sudler

[11] Patent Number: 5,054,009
[45] Date of Patent: Oct. 1, 1991

[54] MOTOR, IN PARTICULAR, FOR DRIVING A CLOCKWORK

[75] Inventor: Roland Sudler, Frankfurt am Main, Fed. Rep. of Germany

[73] Assignee: VDO Adolf Schindling AG, Frankfurt am Main, Fed. Rep. of Germany

[21] Appl. No.: 389,969

[22] Filed: Aug. 4, 1989

[30] Foreign Application Priority Data

Aug. 22, 1988 [DE] Fed. Rep. of Germany ....... 3828465

[51] Int. Cl.$^5$ .................. H02K 37/00; G04F 5/00
[52] U.S. Cl. .................... 368/157; 368/160; 310/49 R; 310/40 MM
[58] Field of Search .............. 368/157–160; 310/49 R, 40 MM, 156, 89, 83

[56] References Cited

U.S. PATENT DOCUMENTS

| 3,241,397 | 3/1966 | Wilkinson | 310/40 MM |
| 3,600,615 | 8/1971 | Morita | 310/40 MM |
| 4,115,713 | 9/1978 | Decosta et al. | 310/40 MM |
| 4,482,829 | 11/1984 | Tardieu et al. | 310/40 MM |
| 4,682,065 | 7/1987 | English et al. | 310/40 MM |
| 4,806,811 | 2/1989 | Mayumi et al. | 310/40 MM |

FOREIGN PATENT DOCUMENTS 0014812 2/1977 Japan ............................ 310/40 MM Primary Examiner—Bernard Roskoski
Attorney, Agent, or Firm—Martin A. Farber

[57] ABSTRACT

In a motor, in particular for the electrical driving of a clockwork, a rotor (32) which is mounted rotatably together with a shaft (3) consists of a permanent magnet having diametrically opposite permanent magnet poles. A coil arrangement in the motor comprises two coils (10 and 11) arranged at angular distances of, in particular, 90° apart from each other. In order to produce in the motor, without a stator with salient poles of ferromagnetic material, detent moments which permit feeding the coils with short pulses, a coil body (14) of non-ferromagnetic material is provided for receiving the coils (10, 11), the coil body being shaped cylindrically inside and outside with webs (17–20) which are arranged at equal distances apart over the circumference and extend cylindrically on the outside, and a screening ring (48) of a material of high residual coercive field strength is disposed concentrically on the coil body for interacting with magnetic fields produced by currents in the coils to produce a remanent bias field retained after deenergization of the coils.

10 Claims, 6 Drawing Sheets

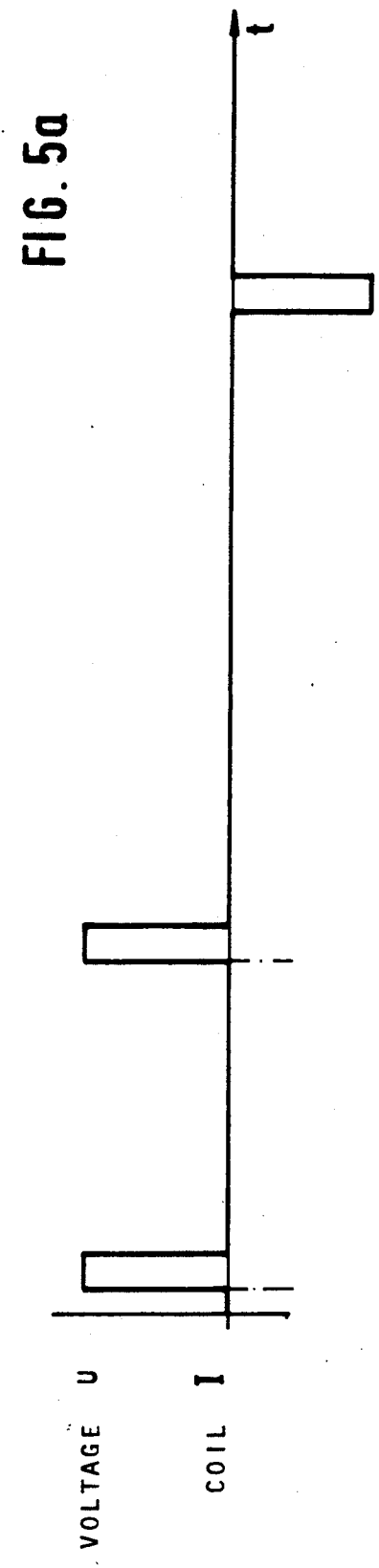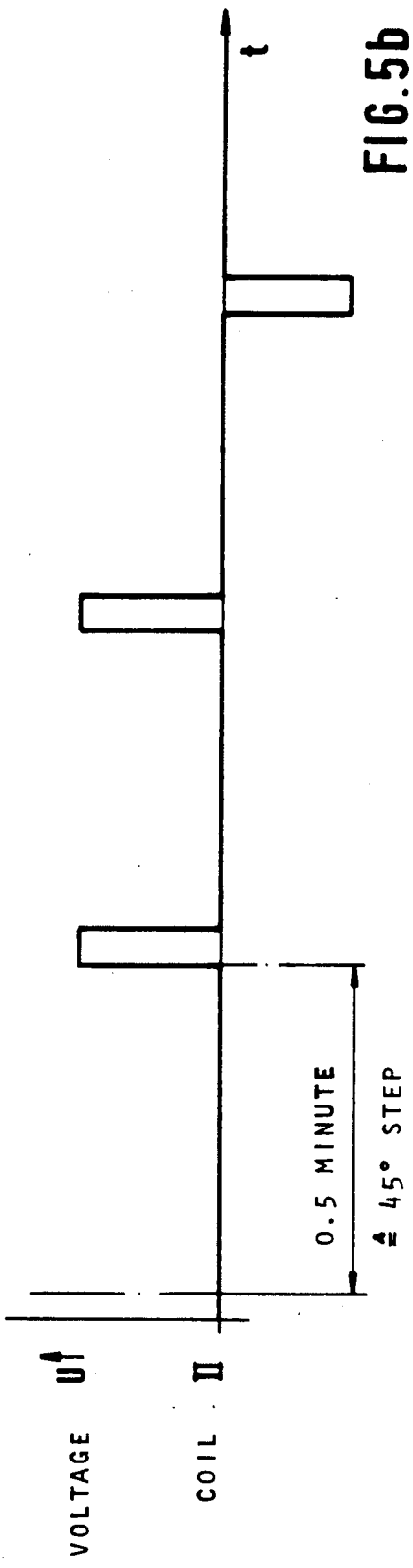

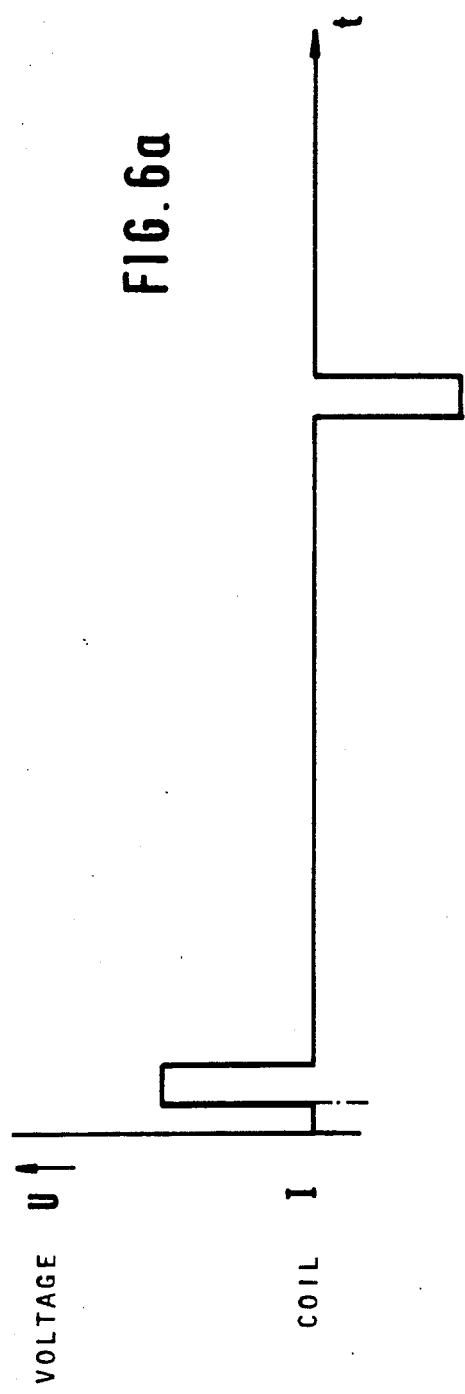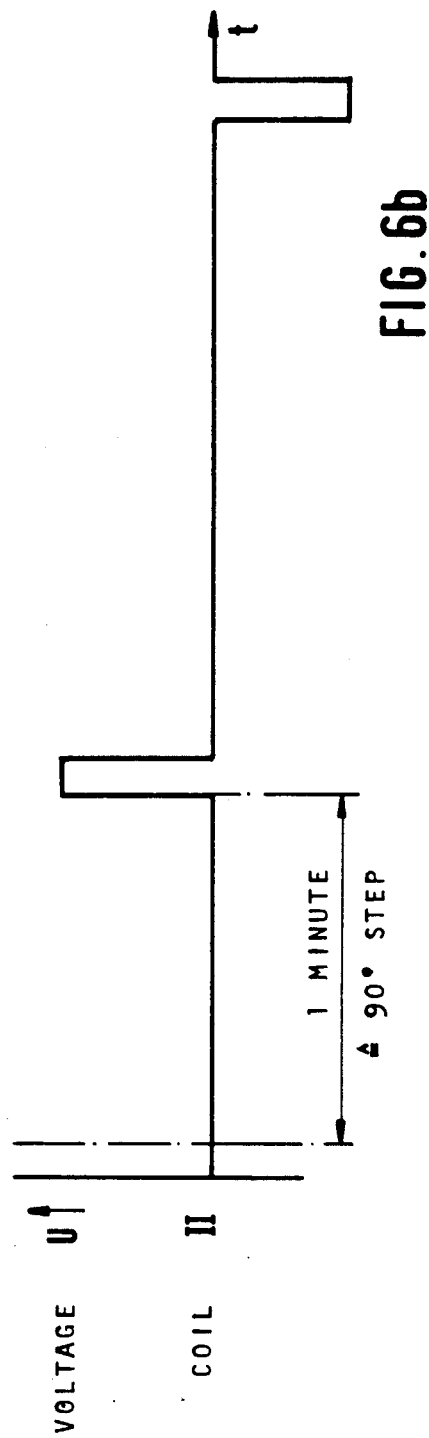

MOTOR, IN PARTICULAR, FOR DRIVING A CLOCKWORK

FIELD AND BACKGROUND OF THE INVENTION

The present invention relates to a motor, in particular for the electrical drive of a clockwork, having a rotor which is mounted rotatably together with a shaft, the rotor being formed, in particular, of a permanent magnet with diametrically opposite permanent magnet poles, the motor having a coil arrangement with coils which are arranged at an angular distance apart of, in particular, 90°.

In one such known motor for the driving of a clockwork, a rotatably mounted rotor has diametrically opposite permanent magnet poles (Federal Republic of Germany OS 34 19 100). A multi-phase coil arrangement serves to produce a rotor-deflecting magnetic field as a function of control signals which are applied to coils of the coil arrangement. For this purpose, the coil arrangement has several coils without a stator body of high magnetic conductivity and without magnetic return, the coils surrounding the rotor and being positioned at an equal angular distance apart and being adapted to be controlled by sinusoidal voltages which have a given phase shift relative and each other. The coil arrangement consists, in particular, of two coils which are arranged at right angles to each other and are fed with two sinusoidal voltages which are 90° apart The axis of rotation or rotary shaft can be the seconds shaft or the minutes shaft of the clockwork. In the latter case, a minute hand is fastened on one end of the rotary shaft, which minute hand can be moved over a dial. An hour wheel is driven via a drive pinion arranged on the rotary shaft and a minute wheel, the hour wheel having an hour tube surrounding the rotary shaft An hour hand which can be moved over the dial is fastened on the hour tube. A disadvantage of this motor is that the motor must be fed continuously with sinusoidal voltages resulting in a correspondingly high expenditure of energy. This is true, in particular, when the motor is used to drive a clock in connection with which the space available for arranging a battery is limited.

The prior art also includes an electric tachometer with a pulse motor and a transmission connected thereto which includes a hydraulic damping device (European OS 0 048 459). The damping device comprises a spring by which a worm wheel, which is connected to a motor shaft, is connected to an indicator-hand shaft which extends into an oil dashpot. The motor has coils of a plurality of poles which are fed by an electronic control device with different pulses depending on the direction of rotation of the indicator-hand shaft required to indicate the speed. No details of the motor are disclosed.

To the extent, however, that other known stepping motors which can be fed with pulses have an iron stator which produces a action, one should consider single-phase stepping motors which can only be operated n one direction of rotation and thus do not permit resetting. The manufacture of a ferromagnetic stator with salient poles is expensive. Overshooting of the rotor may under certain circumstances take place upon entrance into the detent positions. Separate damping is required if such a noise-producing entrance is to be avoided.

SUMMARY OF THE INVENTION

It is an object of the present invention further to develop a motor, in particular for the electrical driving of a clockwork of the type indicated above, in such a manner that a action of the rotor movement is obtained without constructing the stator of ferromagnetic material with salient poles. The motor is to be of simple construction and thus permit economical manufacture. The action is to be provided in a structurally simple manner so that no undesirably hard entrance into the stop position occurs. The motor must be capable of operating in two directions so as to permit, for instance in the case of a clock, a rapid forward and backward setting of the clock.

According to the invention, a coil body (14) of non-ferromagnetic material is provided for receiving the coils (10, 11), the coil body being of cylindrical shape on the inside and on the outside and being shaped on the outside with webs (17 to 20) spaced at equal distances apart along the circumference, there being a screening ring (48) of a material of high residual coercive field strength which is placed concentrically over the coil body (14).

A well-defined detent action can be advantageously obtained in this case by the screening ring of a material of high residual coercive field strength without salient ferromagnetic poles of the stator. The screening ring can be shaped, in particularly simple manner, as a cylindrical hollow cylinder and be pushed over the webs of the coil body which extend cylindrically on the outside. Overshooting of the rotor is strongly dampened by the high residual coercive field strength of the return ring, so that a reduction in noise is obtained. The holding moment in the non-excited state of the stator is nevertheless sufficiently great. The motor can therefore be controlled by short pulses which represent only a low average consumption of current. Depending on the control of the motor, the latter can provide different stop positions or detent steps with the same structural development so that, for instance, a minute jumper or half-minute jumper can be realized, as desired, with the same gear.

A value of at least 50 Oe can be selected as high residual coercive field strength which the screening ring (48) is to have. The selection of a material with a residual coercive field strength of 80-100 Oe for the screening ring (48) has proven particularly suitable.

A shape of the coil body receiving the screening ring which is particularly favorable for manufacture and, in particular, for assembly consists therein that the coil body (14) is divided into two parts (15, 16), bearings (36, 37) of the shaft (35) of the rotor (32) are so shaped that the shaft protrudes out of the coil body (14) on at least one front outer side (12). One of the two parts (15, 16) of the coil body (14) has at this end tab shaped clips (24–27) for a clamping attachment of an intermediate body (2) containing a clockwork. Bore holes (38–43) are provided in the coil body (14) parallel to the shaft (35) for connecting pins (4–7). In this way, there is created, in a structurally simple manner, a basic system for a quartz clock, in particular with rapid forward and backward resetting possibilities with the motor and with a clockwork in an intermediate body which can be modified in building block fashion, depending on the use. The motor is so developed that it can be assembled without further changes with intermediate bodies of different interior construction, for instance with a clockwork with or without second-hand shaft. The assembling of all modifications can thus take place in an economical manner as to time and cost. In particular, the divided coil body with its tab-shaped clips for clamping the intermediate body, and which protrude on one part of the coil body towards the front outside, contribute to facility of construction. The tab-shaped clips on the coil body result, in any case, in a precise centering as well as proper positioning and attachment of the intermediate body. The intermediate body can serve for the attachment of a dial.

By a further feature, the concentric screening ring (48) abuts axially on the coil body (14) against a raised inner side of the clips (24-27), the exact placing of the concentric screening ring over the coil body is assured in structurally simple manner.

For the simple manufacture of the parts of the motor and for the assembling thereof, the coil body (14) is furthermore advantageously divided essentially in a transverse plane (A—A), i.e. perpendicular to the shaft which is installed between the two parts of the coil body.

In order to achieve the aforementioned advantages, one of the bearings (36, 37) of the shaft (35) is furthermore advisedly formed from each of the two parts (15, 16) of the coil body (14). The rotor is located between the two bearings in the cylindrical inner space of the coil body. Two windings are so arranged on the coil body as stator, 90° apart from each other, that the conductors are located parallel to the shaft in each case between two webs arranged alongside each other on the circumference.

By the features of the invention wherein the shaft (35) protruding out of the front outer end (12) of the coil body (1) engages via a pinion (13) into the clockwork enclosed in the intermediate body (2), the pinion on the motor shaft can engage directly into a clockwork placed thereon.

The connecting pins which are passed through the paraxial bore holes and on which the cross-coil-rotary magnet arrangement can be fastened, which connecting pins (4-7) protrude out of at least one of the ends of the coil body (14), extend on one end, in particular the forward end, out of the coil body and possibly out of the clockwork placed thereon in the intermediate body. A dial can be fastened on the forward protruding connecting pins.

BRIEF DESCRIPTION OF THE DRAWINGS

With the above and other objects and advantages in view, the present invention will become more clearly understood in connection with the detailed description of preferred embodiments, when considered with the accompanying drawing, of which:

FIG. 2 is a longitudinal section essentially through the motor, with the pinion and screening ring placed on;

FIGS. 5a and 5b show the variations with time of voltages with which coils of the quartz clock of FIG. 4 are fed as ½-minute jump; and FIGS. 6a and 6b show corresponding variations with time of the voltages upon control of the quartz clock in a second embodiment as minute jump.

DETAILED DESCRIPTION OF THE PREFERRED EMBODIMENT

Figure 1:
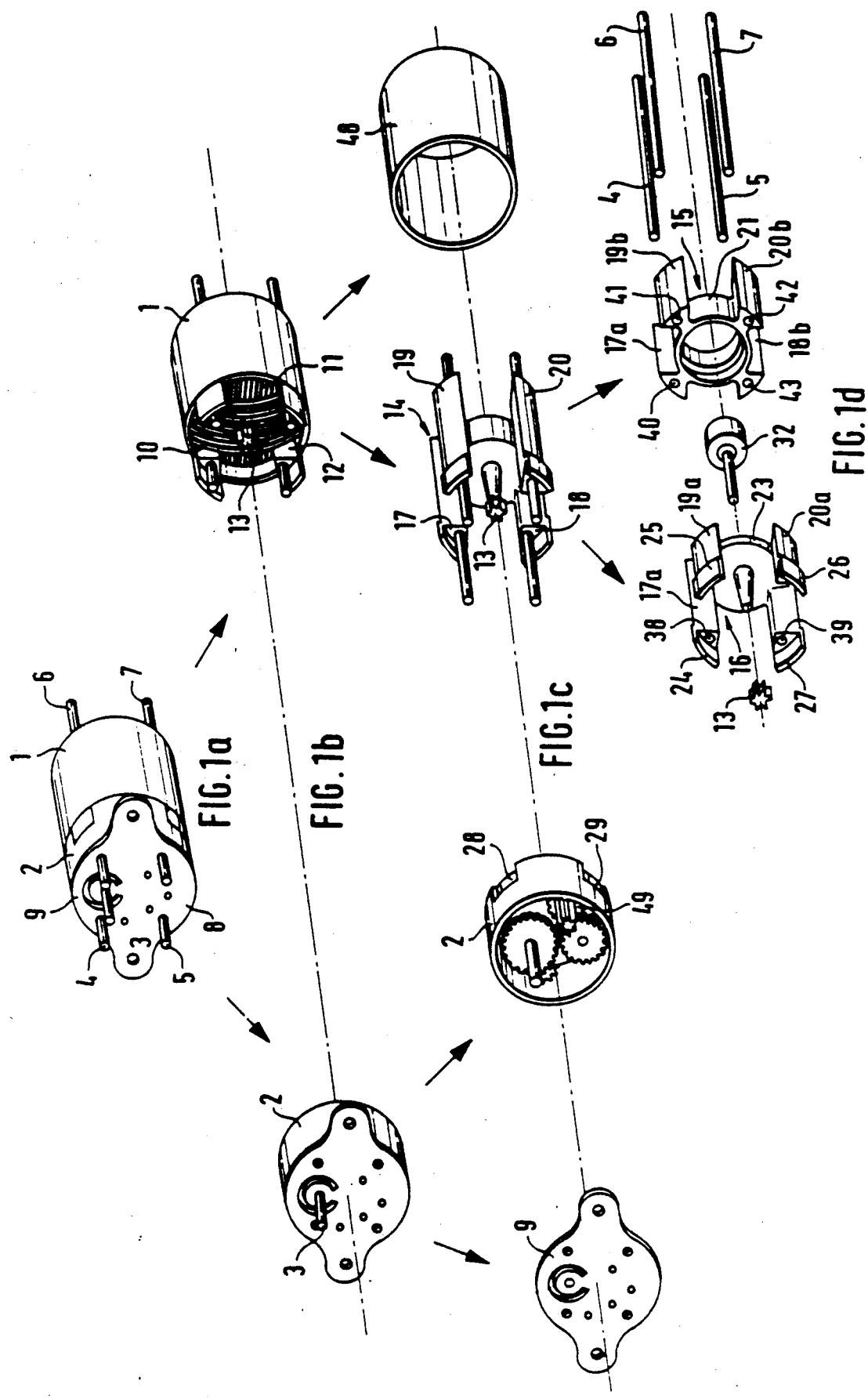
FIGS. 1a-1d show a perspective view of an embodiment of the motor with a gearing arranged in the intermediate body, with increasing degree of disassembly of the motor in FIGS. 1b-1d in the form of exploded drawings.

FIG. 1a shows in assembled condition a motor assembly which is intended to drive a quartz clock. It consists essentially of a motor 1 and an intermediate body 2 placed thereon which contains a clockwork. The longitudinal dimensions of the motor and of the intermediate body 2 account for the entire height h of the motor assembly which is controlling for installation. FIG. 1a furthermore shows a driven shaft 3 which extends eccentrically forward out of the intermediate body 2. Connecting pins which pass through the assembly and extend out of it from both sides at the outer ends thereof are designated 4-7. The front end of the assembly is designated 8. It is formed by a plate 9 which closes the intermediate body off in front. The outer ends of the motor itself are concealed in FIG. 1a.

In FIG. 1b the intermediate body which contains the clockwork has been removed from the motor so that the two coils 10 and 11 arranged at an angular distance of 90° with respect to each other can be seen in the motor, the coils forming together a cross-coil or a two-phase winding of a stepping motor. A pinion 13, which is fastened on a shaft 35 (FIG. 2) of the rotor 32, protrudes out of one front outer side 12 of the motor, the pinion, as described below, being adapted to be introduced into the clockwork and the intermediate body in such a manner that it comes into engagement with a gear in the gearing.

Further details of the construction and, in particular, of the motor are disclosed in FIGS. 1c and 1d, the gearing with the plate of the intermediate body being no longer shown in FIG. 1d.

According thereto, a coil body generally designated 14 and divided essentially in a transverse plane A—A (see FIG. 2) comprises two coil-body parts 15 and 16 of non-ferromagnetic material.

The coil body part 15 is shaped cylindrically on the inside and has four webs 17-20 which are curved cylindrically on their outside. According to FIG. 1d, the webs are formed in each case of one front web section 17a, 18a, 19a, 20a and one rear web section 17b, 18b, 19b, 20b which have the same cross-sectional shapes. The webs are shaped in such a manner that they form chambers between them to receive the two coils 10 and 11. The rear web sections 17b, 18b, 19b, 20b converge into a cylindrical ring 21 which is closed on the inside by an intermediate wall 22 (see FIG. 2). The front web sections 17a, 18a, 19a, 20a, on the other hand, are formed on a front wall 23. Tongue-shaped clips 24, 25, 26, 27 protrude from the front web sections 17a, 18a, 19a, 20a, the clips being provided for form locked and force-locked engagement into corresponding recesses in the intermediate body 2 in order to hold the latter clamped. The recesses 28 and 29 are shown in FIG. 1c. The recesses are groove-shaped and also serve as centering means since they are arranged at equal distances apart over the circumference of the intermediate body.

Figure 2:
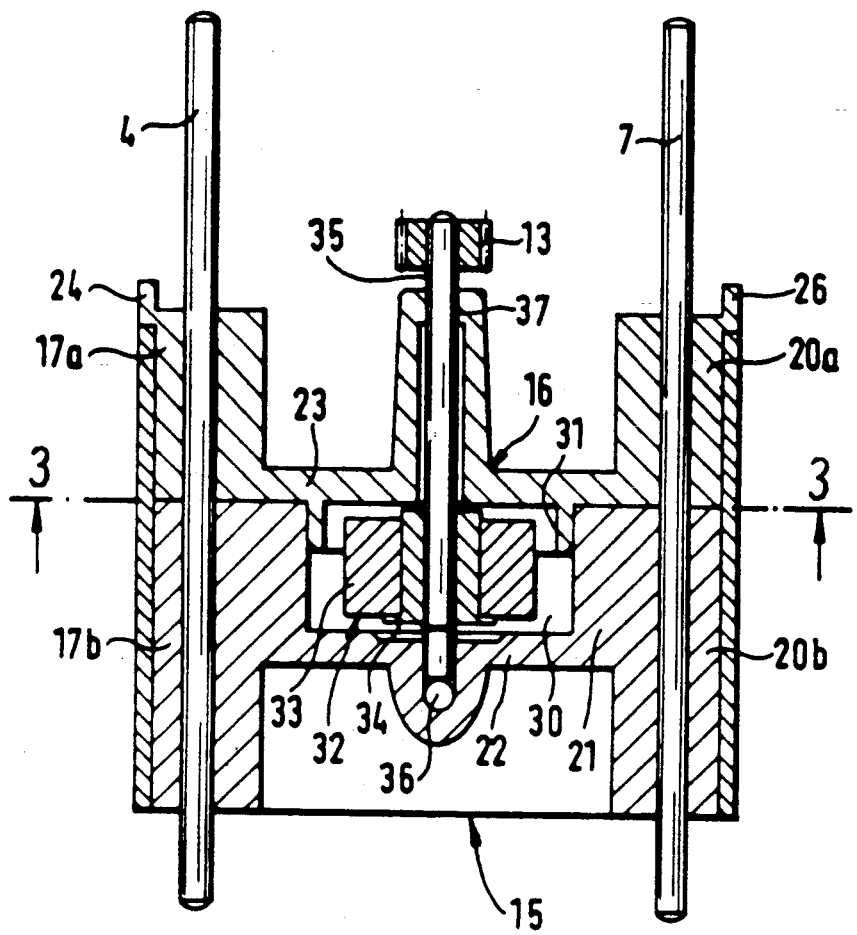

The cylindrical ring 21 of the coil-body part 15 also encloses a cylindrical inner space 30 which is closed off towards the front, or on the top in FIG. 2, by the front wall 23 of the coil-body part 16, which wall is provided with a cylindrical extension 31. A rotor, generally designated 32, is mounted in the cylindrical inner space 30.

The rotor consists essentially of permanent magnet 33 which is magnetized, forming diametrically opposite poles. The rotor is fastened on a shaft 35 via a hub 34. The shaft is mounted for rotation in bearings 36 and 37 respectively in the two coil-body parts 15 and 16 respectively. A pinion 13 is fixed on a front end of the shaft which protrudes out of the coil-body part 16.

It can furthermore be noted from FIGS. 1c, 1d and 2 that connecting pins 4–7 can be passed through bore holes, for instance bore holes 38, 39 in the coil-body part 16 and bore holes 40–43 in the coil-body part 15, which are aligned with each other in pairs. The connecting pins can serve also for the attachment of additional components, such as, for instance, a dial, or for the attachment of the motor with gearing in a housing.

It can furthermore be noted from FIGS. 1c and 2 how a cylindrical screening ring 48 of ferromagnetic material is pushed on the outside over the webs, the screening ring consisting of a ferromagnetic material of high residual coercive field strength of 80–100 Oe in order to produce a detaining or holding moment without excitation.

FIG. 1c furthermore shows details of the gearing which is provided in the intermediate body and which can be plugged or clipped on the motor. The pinion 13 on the shaft 35 can be inserted into the intermediate body 2 through an opening 58 in such a manner that it comes into engagement with a first gear of the gearing. The figures, incidentally, do not necessarily show the clockwork 2 as a typical clock gearing, which typically has an hour tube concentric to a driven shaft on which, for example, a minute hand is fastened. The hour tube is usually driven by the driven shaft via gear wheels.

Another embodiment of a clock gearing has a second hand which is directly driven by the motor shaft and concentric to which there are mounted a minute tube and an hour tube which are connected to each other by gears.

It can be noted from FIG. 2 that the bearing 36 is so developed that it can also take up axial forces, i.e. the motor can be operated in the vertical position shown.

Figure 3:
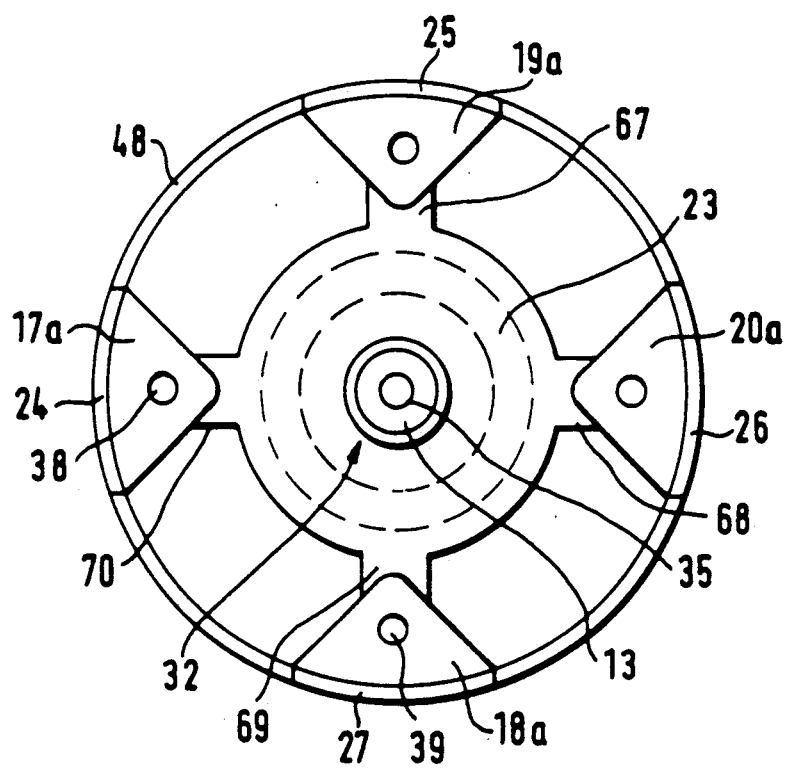
FIG. 3 is a view of the shaft-side of the motor of FIG. 2.

FIG. 3 shows a view of the front side of the cross-coil-rotary magnet arrangement without the intermediate body: There can be noted in it the webs or web sections 17a, 18a, 19a, 20a which are arranged at equal distances apart over the circumference of the substantially cylindrical coil body, said webs or web sections having protruding clips 24–27 against the rearward end sides of which the screening ring 48, which has been placed on the coil body, abuts. The web sections pass into the front wall 23 at the places 67–70. The central shaft 35, on which the pinion 13 is fastened, can also be noted. The rotor 32, which is covered by the front wall 23, is merely indicated by a dashed line.

Figure 4:
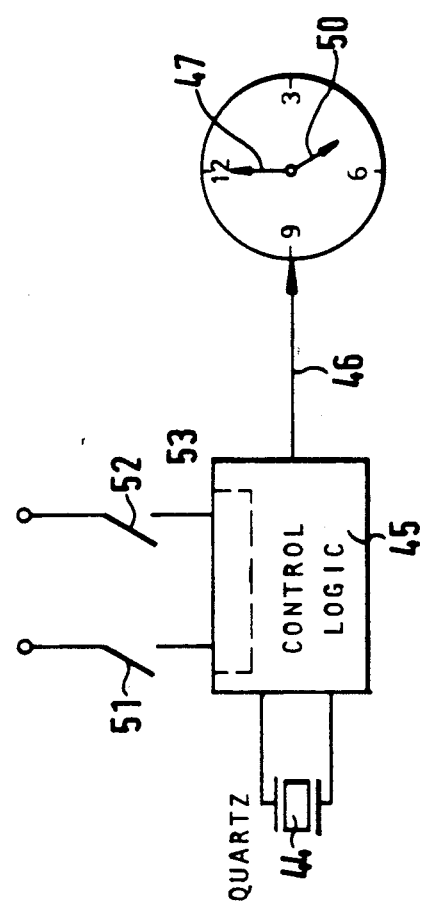
FIG. 4 is a greatly simplified block diagram of a quartz clock with the motor and a control logic.

The electric control of the motor of a quartz clock takes place according to FIG. 4 by means of a crystal of quartz 44 as frequency-determining element of an oscillation circuit which is included in a control logic 45 and which, via an adjustable frequency divider 53, produces pulses for the two coils I and II of FIGS. 5a, 5b, 6a and 6b which correspond to the coils 10 and 11 of FIG. 1. The construction of the control logic can be noted from the illustration of the sequence of control pulses given in FIGS. 5a, 5b, 6a and 6b. These control pulses are fed, via a line 46, to the two coils of the motor 1 which moves a minute hand 47 and an hour hand 50.

As shown in FIGS. 5a and 5b, the control pulses which are produced by the control logic 45 normally follow each other at intervals of 30 seconds for at least one coil. The control pulses can in this connection in each case assume one of two possible polarities. Upon each control pulse, the motor 1 is displaced by a step of 45°. The clockwork is so dimensioned that to this 45°-step of the motor there corresponds a jump of the minute hand of half a minute. Therefore, an intermediate step of half a minute is formed between each displacement by one minute.

The control pulse sequences according to FIGS. 6a and 6b, on the other hand, are characterized by the fact that for each minute at least one pulse is produced for one of the two coils. Upon each new pulse, the motor makes a step of 90° which is converted via the gearing into a jump of the minute hand by one minute.

FIG. 4 also shows two setting contacts 51 and 52 which act on the control logic via the adjustable frequency divider 53. Upon the closing of one of the two setting contacts 51 or 52, the division ratio of the frequency divider is, for instance, changed in such a manner that a frequency of, for instance, 0.1666 Hz given off in normal operation by the frequency divider is increased to a frequency of, for instance, 25 Hz. By actuation of the control contact 52, the control logic is at the same time switched in such a manner that pulse sequences for the return travel are produced, in connection with which the sequence of pulses are changed analogously as compared with the time diagrams of FIGS. 5a, 5b, 6a and 6b.

I claim:

1. A motor, particularly for electrical drive of a clockwork, comprising
   a shaft, and a rotor which is mounted rotatably together with the shaft, the rotor comprising a permanent magnet with diametrically opposite permanent magnet poles;
   a coil arrangement with coils which are arranged, outside of and enclosing the rotor, at an angular distance apart of, particularly 90° about the shaft to permit a two-phase energization of the coils, each coil lying in a plane which includes an axis of said shaft;
   a coil body of non-ferromagnetic material for supporting the coils, said shaft being rotatable relative to said coil body, the coil body being of cylindrical shape on the inside and being formed on the outside with webs spaced at equal distances apart along the circumference of the coil body, the webs being of cylindrical shape on the outside; and
   a screening ring of a material of high residual coercive field strength disposed concentrically over the coil body for interaction with magnetic fields produced by currents in the coils to produce a remanent bias field retained after deenergization of the coils.

2. A motor according to claim 1, wherein the screening ring is made of a material which has a residual coercive field strength of a least 50 Oe.

3. A motor according to claim 1, wherein the screening ring is made of a material which has a residual coercive field strength of 80–100 Oe.

4. A motor according to claim 1, further comprising bearings for supporting the shaft of the rotor;
   an intermediate body and tab-shaped clips for securing the intermediate body to the coil body, the intermediate body being suitable for constructing a clockwork; and the coil body is divided into two parts, the bearings are disposed in the coil body and are so shaped that the shaft protrudes out of the coil body on at least one front outer side, one of the two parts of the coil body is secured at the front outer side by the clips by clamping attachment to the intermediate body;

the coil body has bore holes disposed parallel to the shaft, there being connecting pins threading through the bore holes to secure the two parts of the coil body.

5. A motor according to claim 4, wherein the clips each have a raised inner side; and the concentric screening ring abuts axially on the coil body against the raised inner side of the clips.

6. A motor according to claim 5, wherein the coil body is divided essentially in a cross-sectional plane.

7. A motor according to claim 4, wherein the coil body is divided essentially in a cross-sectional plane.

8. A motor according to claim 7, wherein there are two of said bearings, and the bearings are disposed in respective ones of the two parts of the coil body.

9. A motor according to claim 4, further comprising a pinion secured to said shaft of the rotor; and wherein the shaft protrudes out of the front outer end of the coil body to engage via the pinion with a clockwork enclosed in the intermediate body.

10. A motor according to claim 4, wherein the connecting pins project out of at least one end of the coil body.

* * * * *